(12) United States Patent  
Zydron (10) Patent No.: US 8,002,538 B2  
(45) Date of Patent: Aug. 23, 2011

(54) COLLAPSIBLE CORE ASSEMBLY FOR A MOLDING APPARATUS

(75) Inventor: Garry Zydron, Romeoville, IL (US)

(73) Assignee: Garry Zydron, Romeoville, IL (US)

( * ) Notice: Subject to any disclaimer, the term of this patent is extended or adjusted under 35 U.S.C. 154(b) by 457 days.

(21) Appl. No.: 11/985,039

(22) Filed: Nov. 13, 2007

(65) Prior Publication Data

US 2009/0121115 A1     May 14, 2009

(51) Int. Cl.
  *B28B 7/20*     (2006.01)
  *B29C 45/44*     (2006.01)

(52) U.S. Cl. ........ 425/417; 425/438; 425/577; 425/809; 425/DIG. 58; 249/178; 249/180; 249/184; 264/313; 264/318

(58) Field of Classification Search .............. 249/63–64, 249/178, 180, 184, 186, 59; 425/577, 438, 425/809, DIG. 58, 468, 417; 264/318; *B29C 45/44*
See application file for complete search history.

(56) References Cited

U.S. PATENT DOCUMENTS

| | | | |
|---|---|---|---|
| 3,247,548 A | 4/1966 | Harold et al. | |
| 3,632,264 A | 1/1972 | Butcher | |
| 3,655,323 A | 4/1972 | Hall | |
| 4,021,180 A | 5/1977 | Smith | |
| 4,209,161 A * | 6/1980 | Horvath | 249/180 |
| 4,286,766 A | 9/1981 | von Holdt | |
| 4,533,312 A | 8/1985 | Von Holdt | |
| 4,618,121 A | 10/1986 | Conti | |
| 4,627,810 A | 12/1986 | Von Holdt | |
| 4,723,430 A | 2/1988 | Hahn | |
| 4,861,257 A | 8/1989 | Siotani | |
| 4,919,608 A | 4/1990 | Catalanotti et al. | |
| 4,938,679 A | 7/1990 | Pietrorazio | |
| 5,403,179 A * | 4/1995 | Ramsey | 425/577 |
| 6,506,330 B1 | 1/2003 | Schweigert et al. | |
| 7,293,341 B2 | 11/2007 | Zydron | |
| 2006/0061009 A1 | 3/2006 | Clack | |
| 2009/0152770 A1* | 6/2009 | Mikac et al. | 264/334 |

\* cited by examiner

*Primary Examiner* — Philip C Tucker
*Assistant Examiner* — William P Bell
(74) *Attorney, Agent, or Firm* — Erickson Law Group, PC (57) ABSTRACT

A collapsible core device for molding articles around the core device in a mold cavity includes an expansion member, a discontinuous first sleeve and a discontinuous second sleeve. When the expansion member is fitted within the first and second sleeves, the expansion member and the first and second sleeves form a substantially continuous, flush top molding surface with the first and second sleeves.

20 Claims, 7 Drawing Sheets

COLLAPSIBLE CORE ASSEMBLY FOR A MOLDING APPARATUS

TECHNICAL FIELD OF THE INVENTION

This invention relates to part of an injection mold that produces parts requiring details such internal threads, undercuts, protrusions, or cut-outs. Specifically, the invention relates to collapsible cores that are configured to change from an expanded condition to mold an article on the core, to a collapsed condition that allows the article to be removed from the core.

BACKGROUND OF THE INVENTION

A collapsible core for molding parts is disclosed in U.S. Patent Application US 2006/0188602. That patent discloses a two-sleeve collapsible core device for molding articles around the core device in a mold cavity. The first sleeve includes a plurality of first ribs extending from a first base in an axial direction and defining a discontinuous first perimeter surrounding a channel. The second sleeve includes a plurality of second ribs extending from a second base in an axial direction and defining a discontinuous second perimeter surrounding the central channel. Each of the second ribs is arranged between adjacent ones of the first ribs. The expansion member is fittable within the central channel to displace the first and second ribs outwardly to form an overall perimeter defined by the first and second ribs.

In practice, the expansion member is slightly tapered or rounded at an end thereof to prevent friction based wear on the central channel when the expansion member is inserted into the central channel to displace the sleeve rib members outward. The expansion member forms the top part of the molding surface. The rounded end of the expansion member prevents the outer top edge of the expansion member from being flush with the tops of the sleeve rib members. If the expansion member is inserted to the extent that it is flush with tops of the sleeve rib members, the rounded edge and the top of the expansion member must extend a small amount above the tops of the sleeve rib members. Therefore, the expansion member creates an indention or impression on the resulting molded surface. However an expansion member with a non-tapered or non-rounded end could cause undue wear on the central channel.

The present inventor recognizes that it would be desirable to provide a collapsible core assembly that does not cause an indentation or impression in the molded surface, but also wherein the expansion member does not cause undue friction and wear on the central channel when the expansion member is inserted into the central channel.

SUMMARY OF THE INVENTION

The present invention provides a collapsible core device for molding articles around the core device in a mold cavity. The core device comprises a collapsible core sidewall assembly that when expanded defines a core with a core perimeter wherein articles are molded around the core perimeter, and an expansion member that acts to expand the collapsible core sidewall assembly to the expanded condition and forms an end surface of the core wherein the end surface can be flush with contiguous portions of the collapsible core sidewall assembly to form a smooth top wall of the core for forming a smooth inside surface of an article formed thereby.

The core device of the preferred embodiments includes a first sleeve, a second sleeve, and an expansion member. When the expansion member is fitted within the first and second sleeves, the expansion member and the first and second sleeves form a molding surface, and the expansion member forms a substantially continuous, flush surface with the first and second sleeves.

The first sleeve member includes a plurality of first ribs extending from a first base in an axial direction and defining a discontinuous first perimeter surrounding a central channel. Each of the first ribs includes a first lip end opposite the first base. The first lip end has a first rib lip that protrudes radially toward the central channel. The second sleeve member includes a plurality of second ribs extending from a second base in an axial direction and defining a discontinuous second perimeter surrounding the central channel. Each of the second ribs includes a second lip end opposite the second base. The second lip end includes a second rib lip that protrudes radially toward the central channel.

Each of the second ribs is arranged between adjacent ones of the first ribs. The expansion member is fittable within the central channel to displace the first and second ribs outwardly to form an overall perimeter defined by the first and second ribs.

The first ribs can be tapered in a radially inward direction and the second ribs can be tapered in a radially outward direction and the overall perimeter can be a substantially continuous surface.

The overall perimeter can comprise a cylindrical surface with protruding threads, although other shapes and configurations are also encompassed by the invention.

The first base can be configured as a cap portion and the second base can be configured as a ring portion that is fittable into the cap portion.

The first and second ribs may have a natural resiliency to a collapsed position wherein the first and/or the second discontinuous perimeter is smaller than said overall perimeter.

The expansion member is an elongated member. The elongated member includes a base end, a non-recessed portion, a recessed portion and a recessed end. The recessed portion is located on the elongated member at the recessed end. The recessed portion is radially smaller than the non-recessed portion. The recessed portion is recessed in proportion to the radial protrusion of the rib lip of the first and second sleeves.

The expansion member includes a recess point between the non-recessed portion and the recessed portion. The recess point is rounded.

The recessed end of the expansion member forms a level plane with the first and second sleeves and forms a molding surface.

Numerous other advantages and features of the present invention will become readily apparent from the following detailed description of the invention and the embodiments thereof, and from the accompanying drawings.

BRIEF DESCRIPTION OF THE DRAWINGS

FIG. 22 is a fragmentary, schematical view of the core device in a molding condition within a mold cavity.

DETAILED DESCRIPTION OF THE PREFERRED EMBODIMENTS

While this invention is susceptible of embodiment in many different forms, there are shown in the drawings, and will be described herein in detail, specific embodiments of the invention with the understanding that the present disclosure is to be considered as an exemplification of the principles of the invention and is not intended to limit the invention to the specific embodiments illustrated.

FIGS. 1-6 and FIGS. 19-21 illustrate a collapsible core device 10 in accordance with the present invention. The core device 10 is similar to that disclosed in U.S. Patent Application US 2006/0188602, which is herein incorporated by reference. The invention can also be applied to other known collapsible core devices and is not limited to that shown in U.S. Patent Application US 2006/0188602.

The core device 10 is used in conjunction with a female mold part 16 as shown schematically in FIG. 22.

The core device 10 includes a first, outer discontinuous sleeve 24, defining an outer perimeter 30. A second inner discontinuous sleeve 28 is fit substantially within an outer sleeve central channel 32 of the outer discontinuous sleeve 24. A hollow expansion member 34 is fit within an inner sleeve central channel 36 of the inner discontinuous sleeve 28.

Figure 12:
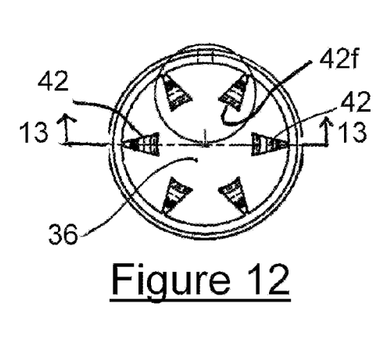
FIG. 12 is a top view of the inner sleeve in a molding condition.
Figure 13:
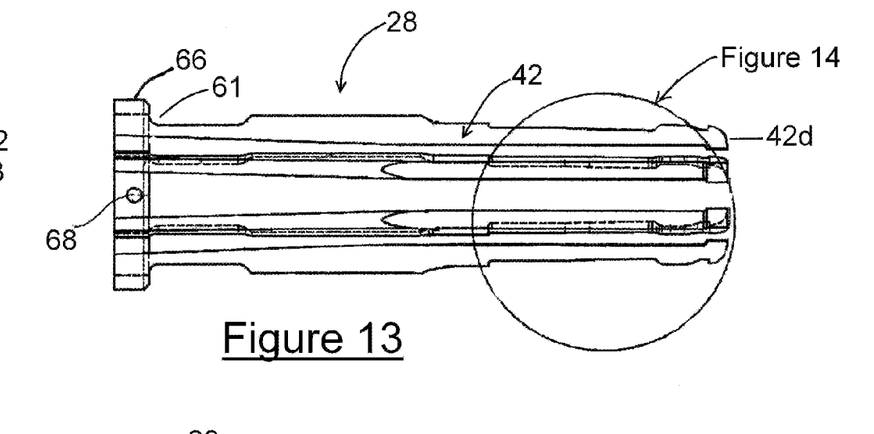
FIG. 13 is a section view of the inner sleeve taken generally along the line 13-13 of FIG. 12 cut through the inner sleeve in a molding condition.
Figure 14:
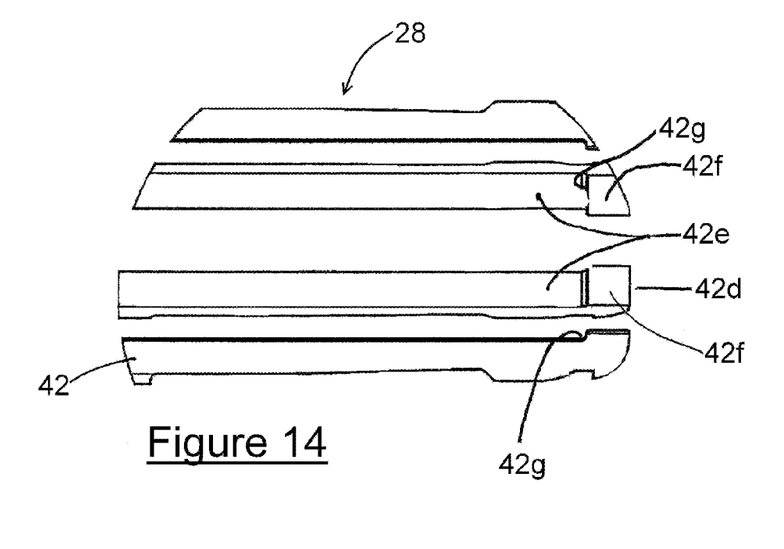
FIG. 14 is an enlarged view taken from FIG. 13 showing the ribs of the inner sleeve.
Figure 15:
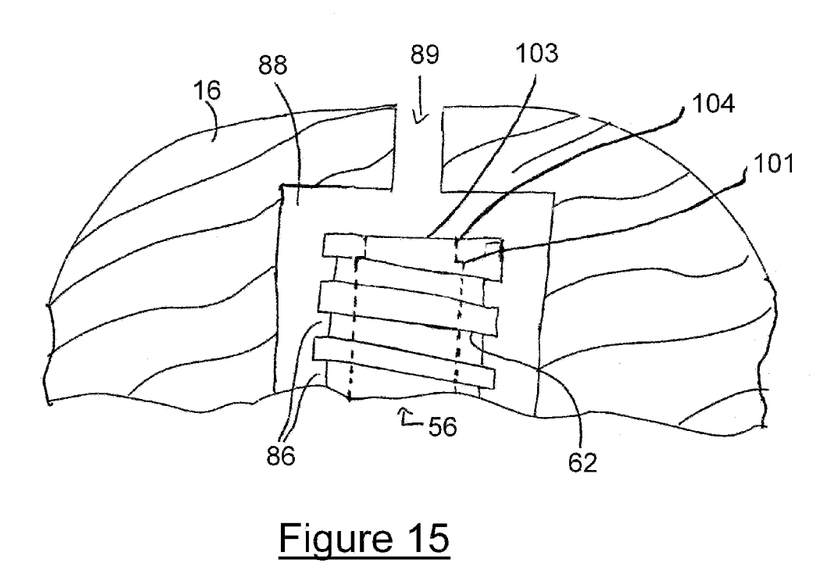

The outer discontinuous sleeve 24, as shown in FIGS. 7-11, includes ribs 46 that have a tapered thickness decreasing radially inward. The inner discontinuous sleeve 28, as shown in FIGS. 12-14, includes ribs 42 that have a tapered thickness decreasing radially outward. The ribs 46 of the outer sleeve 24 have gaps 50 between adjacent ribs 46 for receiving the ribs 42 of the inner sleeve 28.

FIGS. 4-6 and FIGS. 19-21 show the core device 10 in a molding condition. When the expansion member 34 is located tightly within the channel 36, the ribs 42 of the inner sleeve are forced into the gaps 50, and wedge therein between the adjacent ribs 46 of the outer sleeve. The ribs 42, 46 in the position shown in FIGS. 4-6 and FIGS. 19-22 form a continuous cylinder 56, which forms an outside cylindrical surface of an item being molded. Preferably grooves or threads 62 or other indentations or protrusions are cut or formed on an outside surface of the cylinder 56 as shown in FIG. 22.

Figure 1:
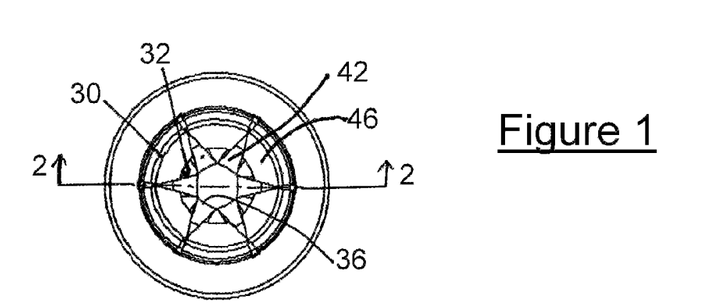
FIG. 1 is a top view of the core device of the present invention showing the device in a collapsed condition.
Figure 2:
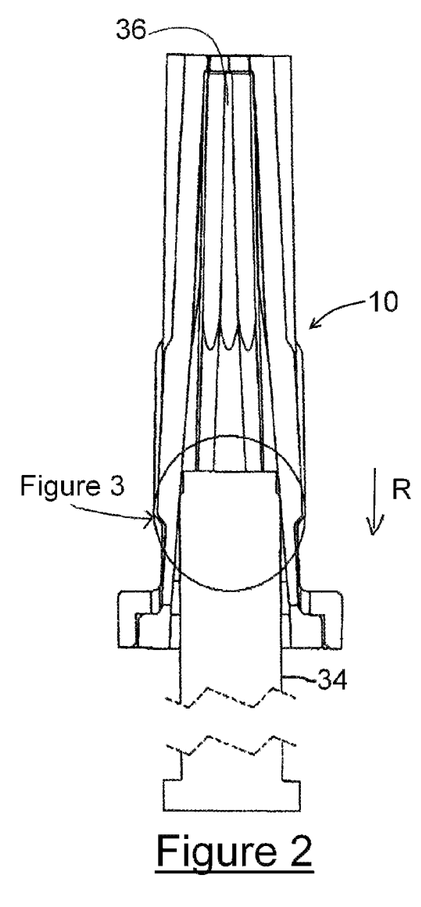
FIG. 2 is a sectional view of the core device taken generally along the line 2-2 of FIG. 1 showing the device in a collapsed condition cut through both the inner and outer sleeves.
Figure 3:
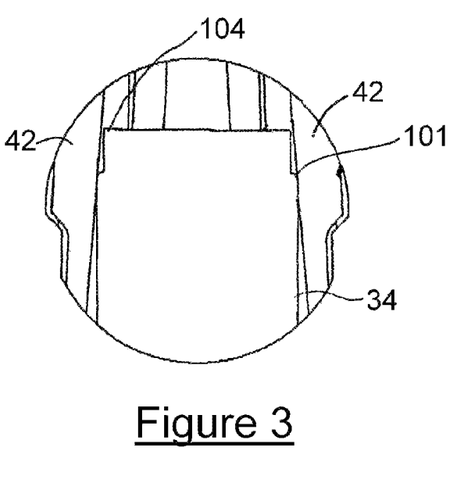
FIG. 3 is an enlarged view taken from FIG. 2 showing an expansion member and the inner sleeve.
Figure 4:
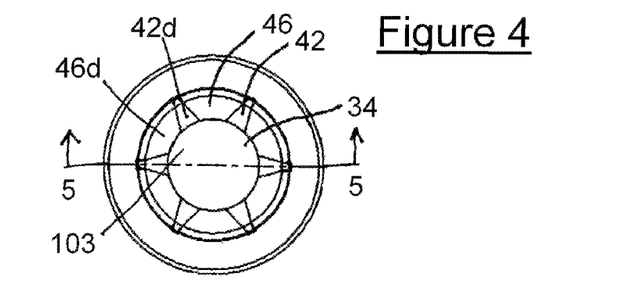
FIG. 4 is a top view of the core device of the present invention showing the device in a molding condition.
Figure 5:
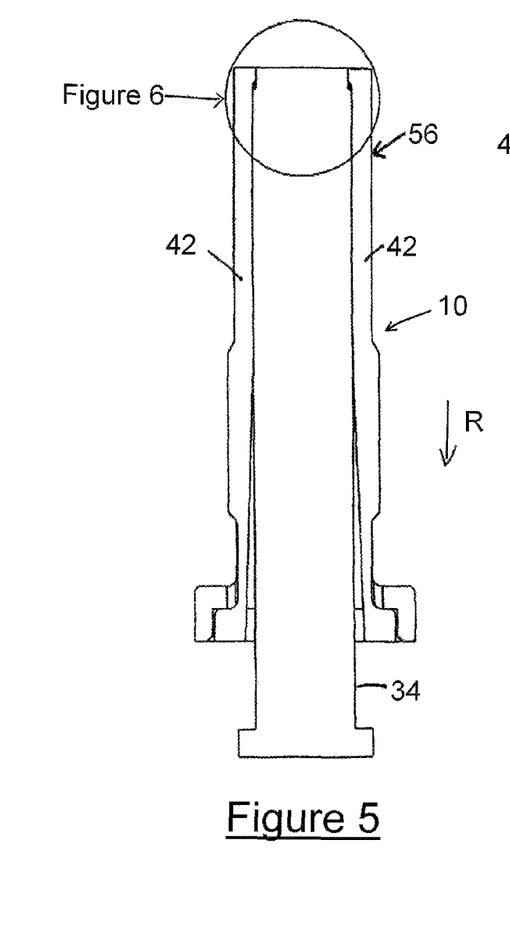
FIG. 5 is a section view of the core device taken generally along the line 5-5 of FIG. 4 showing the device in a molding condition cut through both the inner and outer sleeves.

FIGS. 1-3 show a collapsed condition of the core device 10. The expansion member 34 has been retracted from the channel 36 in the direction R. The ribs 42 of the inner sleeve 28 have an unstressed or natural position. The ribs 46 of the outer sleeve 24 also have an unstressed or natural position. The ribs 42 of the inner sleeve 28 collapse to a greater extent than the ribs 46 of the outer sleeve 24 to allow for the overall collapsing of the cylinder 56.

FIGS. 12-14 show the inner sleeve in more detail. The ribs 42 are formed to a base ring 66 at a base end 61 of the ribs 42. The base ring 66 includes a hole 68, which can be threaded. The ribs 42 have a lip end 42*d* opposite the base end 61. Each rib 42 has an inner rib face 42*e*, which forms part of the inner surface of rib 42. Each rib 42 also has an inner rib lip 42*g* and an inner rib lip face 42*f* at the lip end 42*d* of the rib 42. The inner rib face 42*e* and the inner rib lip face 42*f* partially form the inner sleeve central channel 36. The inner rib face 42*e* is recessed in relation to the inner rib lip face 42*f*. The inner rib lip 42*g* is perpendicular to the inner rib face 42*e* and the inner rib lip face 42*f*. The inner rib lip 42*g* forms a partial underside to the inner rib lip face 42*f*. The intersection of the inner rib lip 42*g* and the inner rib face 42*e* may be rounded or may be exactly perpendicular at the point of intersection.

FIGS. 7-11 show the outer sleeve in more detail. The ribs 46 are formed to a cap portion 76 at a base end 71 of the ribs 46. The ribs 46 have a lip end 46*d* opposite the base end 71. Each rib 46 has an inner rib face 46*e*, which forms part of the inner surface of rib 46. Each rib 46 also has an inner rib lip 46*g* and an inner rib lip face 46*f* at the lip end 46*d* of the rib 46. The inner rib face 46*e* and the inner rib lip face 46*f* partially form the outer sleeve central channel 32. The inner rib face 46*e* is recessed in relation to the inner rib lip face 46*f*. The inner rib lip 46*g* is perpendicular to the inner rib face 46*e* and the inner rib lip face 46*f*. The inner rib lip 46*g* forms a partial underside to the inner rib lip face 46*f*. The intersection of the inner rib lip 46*g* and the inner rib face 46*e* may be rounded or may be exactly perpendicular at the point of intersection.

The cap portion 76 include an inside region 78 for receiving the base ring 66 of the inner sleeve 28. The cap portion 76 includes a hole 75, which can be used to pin or fasten the cap portion 76 to the base ring 66 at the hole 68 of the base ring 66.

Figure 16:
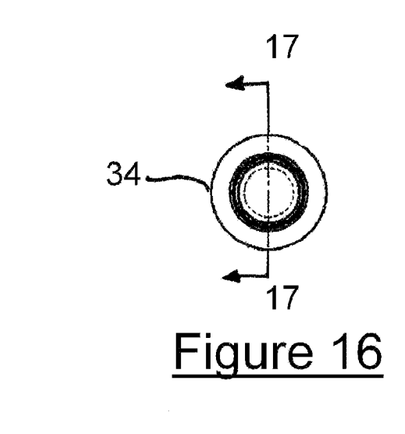
FIG. 16 is a top view of an expansion member.
Figure 17:
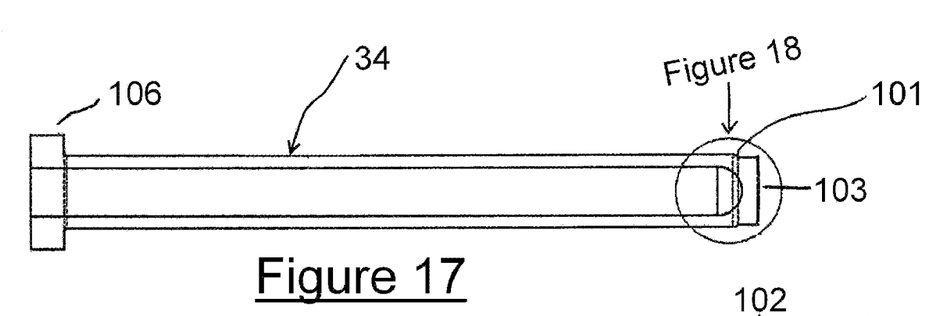
FIG. 17 is a section view taken generally along the line 17-17 of FIG. 16 cut through the expansion member.
Figure 18:
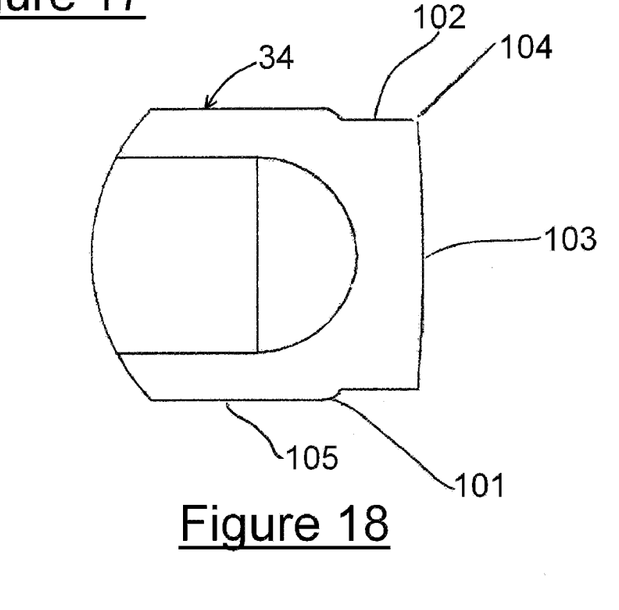
FIG. 18 is an enlarged view taken from FIG. 17 showing the expansion end of the expansion member
Figure 19:
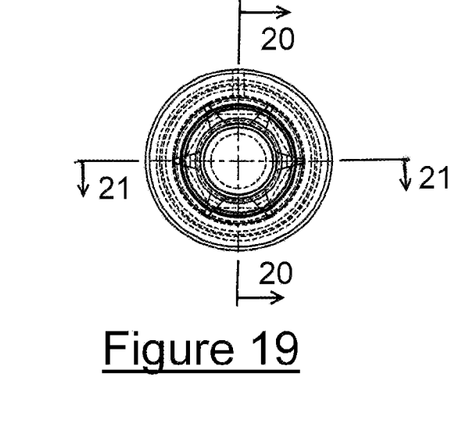
FIG. 19 is a top view of the core device of the present invention showing the device in a molding condition.

FIGS. 16-18 illustrate a cylindrical expansion member 34. The expansion member 34 has a base end 106 and a recessed end 103, which is opposite the base end 106. A recessed portion 102 begins at the recessed end 103. The recessed portion has a substantially perpendicular edge 104 at the recessed end 103. The recessed portion 102 has a radius less than the radius of the non-recessed portion 105. The recessed portion 102 extends from the recessed end 103 toward the base end 106 until a recess point 101. The transition at the recess point 101 is rounded to reduce friction on the ribs 42, 46 of the central channel 32, 36 when the expansion member 34 is slid through the central channel 32, 36.

Figure 6:
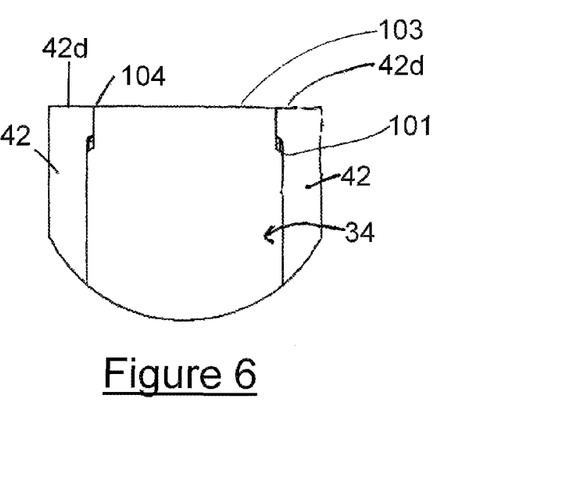
FIG. 6 is an enlarged view taken from FIG. 5 showing the expansion member and the inner and outer sleeves.
Figures 7, 8, 9, 10, 11:
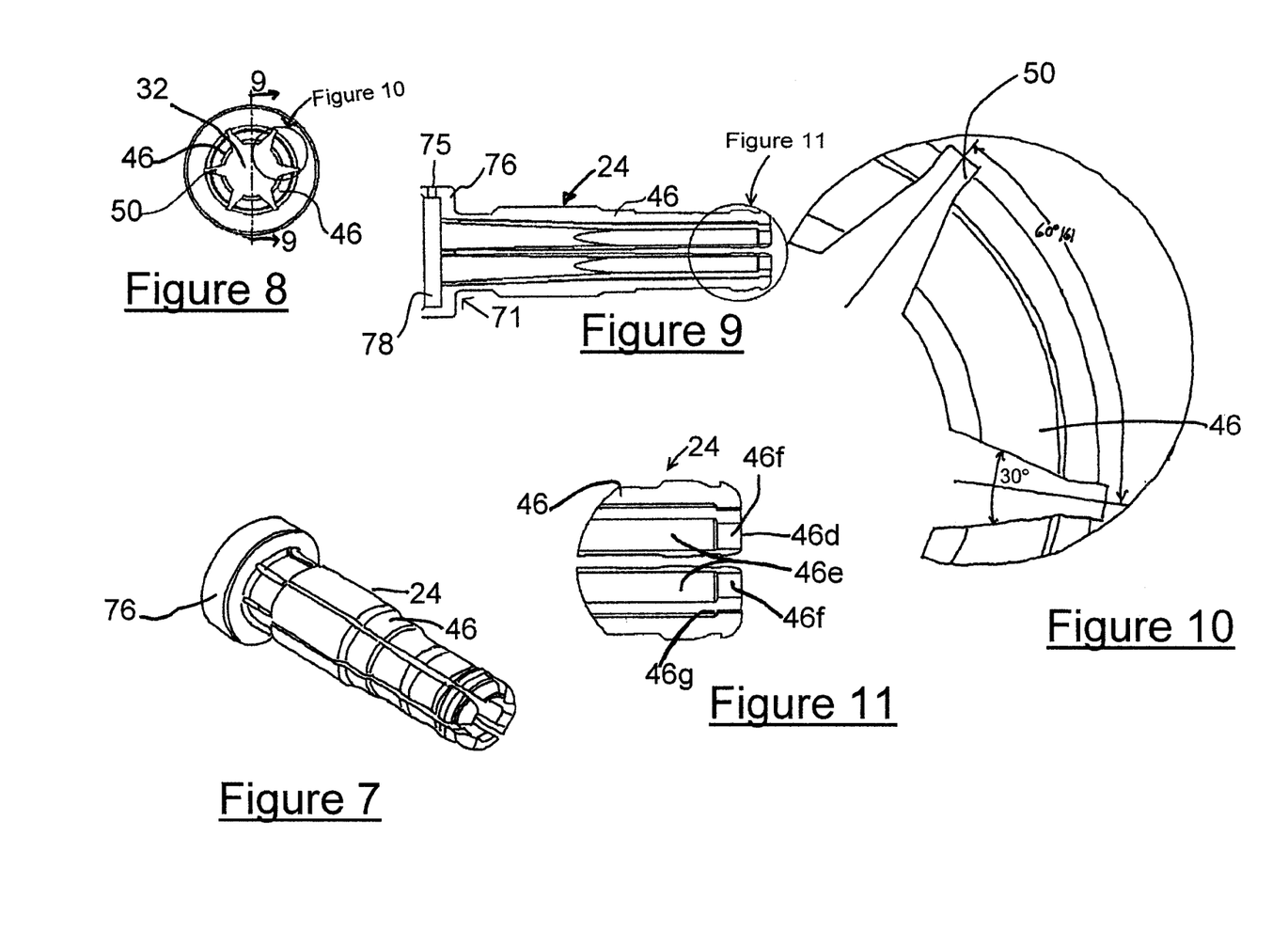
FIG. 7 is a perspective view of the outer sleeve taken from FIG. 1 in a molding position.
FIG. 8 is a top view of the outer sleeve in a molding condition.
FIG. 9 is a section view of the outer sleeve taken generally along the line 9-9 of FIG. 8 cut through the inner sleeve in a molding condition.
FIG. 10 is an enlarged view taken from FIG. 8 showing the ribs of the outer sleeve.
FIG. 11 is an enlarged view taken from FIG. 9 showing the ribs of the outer sleeve.
Figure 20:
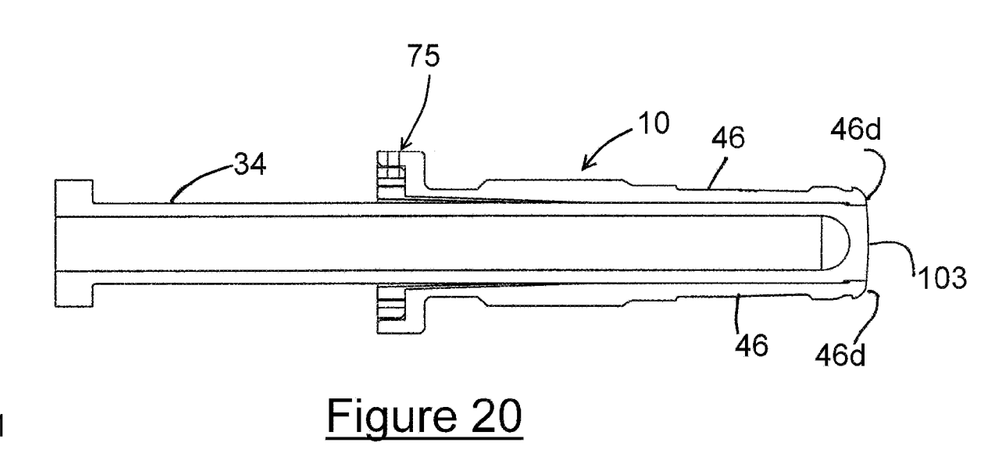
FIG. 20 is a section view taken generally along the line 20-20 of FIG. 19 cut through the expansion member, inner sleeve, and outer sleeve.
Figure 21:
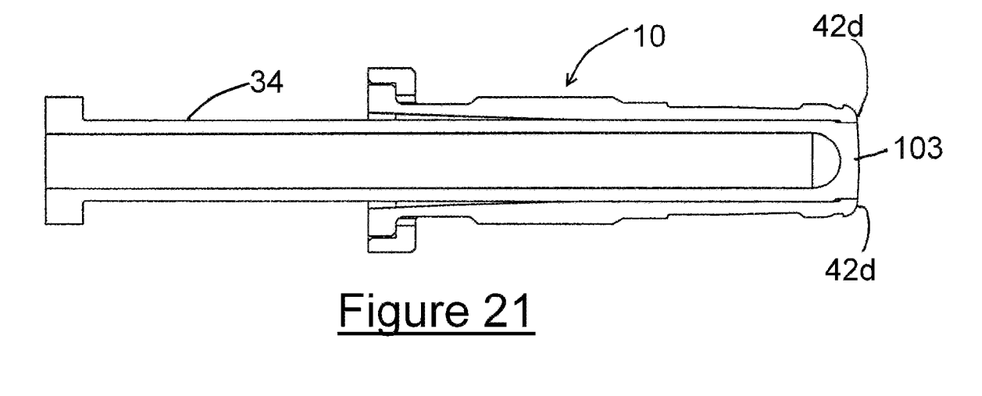
FIG. 21 is a section view taken generally along the line 21-21 of FIG. 19 cut through the expansion member, inner sleeve, and outer sleeve.

As shown in FIG. 3, throughout the sliding extension of the expansion member 34 through the channel 32, 36 to spread open the ribs 42, 46, or the retraction of the expansion member 34 to allow the ribs 42, 46 to collapse, the rounded transition point 101 of the expansion member 34 slides on the ribs 42, 46 and the relatively sharp perpendicular edge 104 does not make contact with the ribs 42, 46. Not until the expansion member is in nearly in the most extended position within the ribs 42, 46 shown in FIG. 6 does the edge 104 make contact with the ribs 42, 46. At this point, the recessed end 103 forms a flush continuous flat, or curved, surface with the end surfaces 42d, 46d of the ribs as shown in FIGS. 6, 20 and 21. As can be seen in these Figures, there is no edge gap between the recessed end 103 and the ribs 42, 46 due to a rounding at edge 104 of the recessed end 103, nor does the end 103 have to protrude further than the adjacent edge of the tops 42d, 46d of the ribs 42, 46. A smooth inside top surface of a cap molded on the core can be achieved.

FIG. 22 illustrates in schematic form a female mold 16 surrounding the continuous cylinder 56 of the core device 10. Grooves or threads 62 are formed on an outside of the ribs 42, 46 to mold outside threads 86 inside a bottle cap 88. The bottle cap 88 is injection molded by molten plastic 89 injected into the mold 16.

FIG. 22 shows that when the expansion member 34 is placed in the central channel 32, 36, the lip end 42d, 46d of the ribs 42, 46 of the inner sleeve 42 and outer sleeve 46 together with the recessed end 103 of the expansion member 34 form a continuous molding surface. When the expansion member 34 is fully fitted within the channel 36, the expansion member 34 does not extend beyond the horizontal plane defined by the lip end 42d, 46d of the ribs 42.

When the cap 88 has sufficiently cooled, the core cylinder 56 is collapsed by withdrawing the expansion member 34 as shown in FIG. 2. The cap 88 can then be removed axially from the cylinder 56 without stripping or distorting the threads 86 of the molded plastic on the threads 62 of the core device 10. Although grooves 62 are shown formed on the continuous core cylinder 56, alternatively ribs or other positive formations could be formed on the surface of the cylinder 56 to form negative impressions on the article being molded.

While the particular preferred and alternative embodiments to the present invention have been disclosed, it will be appreciated that many various modification and extensions of the above described technology may be implemented using the teaching of this invention.

The invention claimed is:

1. A collapsible core device for molding articles around said core device in a mold cavity, comprising:
    a first sleeve member having a plurality of first ribs extending from a first base in an axial direction, said plurality of first ribs defining a discontinuous first perimeter surrounding a central channel;
    each of said first ribs having a first lip end opposite said first base, said first lip end having a first rib lip that protrudes radially toward said central channel, each first rib lip extends along less than the entire length of the corresponding first rib;
    a second sleeve member having a plurality of second ribs extending from a second base in an axial direction, said plurality of second ribs defining a discontinuous second perimeter surrounding said central channel;
    each of said second ribs having a second lip end opposite said second base, said second lip end having a second rib lip that protrudes radially toward said central channel, each second rib lip extends along less than the entire length of the corresponding second rib;
    each of said second ribs arranged between adjacent ones of said first ribs; and
    an expansion member, fittable within said central channel to displace said first and second ribs outwardly to form an overall perimeter defined by said first and second ribs, said expansion member having an end surface that forms at least one exterior molding surface of the collapsible core flush with said first and second lip ends when the expansion member is fitted within the central channel.

2. The core device according to claim 1, wherein said first ribs are tapered in a radially inward direction and said second ribs are tapered in a radially outward direction and said overall perimeter is a substantially continuous surface.

3. The core device according to claim 2, wherein said overall perimeter comprises a cylindrical surface with protruding threads.

4. The core device according to claim 1, wherein said first base comprises a cap portion and said second base comprises a ring portion that is fittable into said cap portion.

5. The core device according to claim 4, wherein said second ribs have a natural resiliency to a collapsed position wherein said second discontinuous perimeter is smaller than said overall perimeter.

6. The core device according to claim 1, wherein said second ribs have a natural resiliency to a collapsed position wherein said second discontinuous perimeter is smaller than said overall perimeter.

7. The core device according to claim 6, wherein said first ribs are tapered in a radially inward direction and said second ribs are tapered in a radially outward direction and said overall perimeter is a substantially continuous surface.

8. The core device according to claim 1, wherein said expansion member comprises an elongated member, said elongated member having a base end, a non-recessed portion, a recessed portion and a recessed end, said recessed portion is located on the elongated member at the recessed end, said recessed portion being radially smaller than the non-recessed portion.

9. The core device according to claim 8, wherein said recessed portion is recessed in proportion to the radial protrusion of said rib lip of said first and second sleeves.

10. The core device according to claim 9, wherein said elongated member has a recess point between said non-recessed portion and said recessed portion, said recess point being rounded.

11. The core device according to claim 9, wherein said recessed end forms a continuous surface with said first sleeve and forms a molding surface.

12. The core device according to claim 8, wherein said elongated member has a recess point between said non-recessed portion and said recessed portion, said recess point being rounded.

13. The core device according to claim 8, wherein said recessed end forms a continuous surface with said first sleeve and forms a molding surface.

14. A collapsible core device according to claim 8, wherein the recessed portion has a longitudinal length and a radius sufficient to prevent a top edge of the recessed portion from contacting the first and second ribs along the first and second ribs below the first rib lips and second rib lips respectively when the expansion member inserted into the center channel.

15. The core device according to claim 1, wherein said first rib lips and said second rib lips protrude equally toward said central channel.

16. A collapsible core device for molding articles around a core in a mold cavity, comprising:

a collapsible core sidewall assembly that when in an expanded condition defines a core with a core exterior perimeter wherein articles are molded around the core exterior perimeter; and an expansion member that acts to expand the collapsible core sidewall assembly to the expanded condition and forms an exterior molding end surface of the collapsible core wherein the end surface can be flush with contiguous portions of the collapsible core sidewall assembly to form a smooth top exterior wall of the core for forming a smooth inside surface of an article formed thereby;

the expansion member has a longitudinal length, a recessed portion, a body portion, the body portion for contacting an inside surface of the collapsible core sidewall assembly;

the recessed portion extending about an outer surface of the elongated member and along a first portion of the longitudinal length, the recess portion terminates at an end opposite the body portion and forms said exterior molding end surface of the collapsible core when the collapsible core sidewall assembly is in the expanded condition;

the body portion extending about the outer surface of the elongated member along a second portion of the longitudinal length;

the body portion having a perimeter that is greater than the largest perimeter of the recessed portion.

17. The core device according to claim 16, wherein said core perimeter defines a cylindrical surface with protruding threads.

18. The core device according to claim 16, wherein the outer surface of the recessed portion is cylindrical, and said recessed portion is recessed in proportion to a radial protrusion of said collapsible core sidewall assembly.

19. The core device according to claim 16, wherein said collapsible core sidewall assembly comprises a radially inwardly directed annular surface when in the expanded condition and said end surface is flushly contiguous with said annular surface in the expanded condition, without any significant depression between said annular surface and said end surface.

20. The collapsible core device of claim 16, wherein a portion of the body portion adjacent to the recessed portion is curved to reduce contact friction between the expansion member and the inside surface of the collapsible core sidewall assembly.

* * * * *